United States Patent [19]

Bany et al.

[11] Patent Number: 4,543,398
[45] Date of Patent: Sep. 24, 1985

[54] OPHTHALMIC DEVICES FABRICATED FROM URETHANE ACRYLATES OF POLYSILOXANE ALCOHOLS

[75] Inventors: Stephen W. Bany, St. Paul; Robert J. Koshar, Mahtomedi; Todd R. Williams, Lake Elmo, all of Minn.

[73] Assignee: Minnesota Mining and Manufacturing Company, St. Paul, Minn.

[21] Appl. No.: 652,417

[22] Filed: Sep. 19, 1984

Related U.S. Application Data

[63] Continuation-in-part of Ser. No. 489,318, Apr. 28, 1983, abandoned.

[51] Int. Cl.$^4$ .............................................. C08G 77/00
[52] U.S. Cl. .................... 525/474; 526/279; 351/160 R; 351/160 H; 204/159.13; 204/159.22; 204/159.23; 528/32; 556/419
[58] Field of Search ............... 351/160 R, 160 H; 204/159.13, 159.22, 159.23; 526/279; 528/32; 556/419; 525/474

[56] References Cited

U.S. PATENT DOCUMENTS 3,808,178  4/1974  Gaylord .............................. 526/279
4,136,250  1/1979  Mueller et al. ...................... 528/29
4,227,595  7/1981  Deichert et al. ..................... 528/26
4,259,467  3/1981  Keogh et al. ....................... 526/279
4,261,875  4/1981  LeBoeuf ............................ 260/29.7

OTHER PUBLICATIONS

Refojo, M. F. et al., "Permeability of Dissolved Oxygen Through Contact Lenses–1. Cellulose Acetate Butyrate," Cont. Intraocular Lens Med. J. 3 (4), 27, (1977).

*Primary Examiner*—Melvyn I. Marquis
*Attorney, Agent, or Firm*—Donald M. Sell; James A. Smith; Lorraine R. Sherman

[57] ABSTRACT

Shaped articles, particularly ophthalmic devices, can be fabricated from oxygen transmissive, hydrolytically stable, polysiloxane copolymers of readily prepared poly(organosiloxane) monomers having monourethane acrylate groups and copolymerizable ethylenically-unsaturated monomers. The ophthalmic devices comprise copolymers of compositions containing 15 to 100 percent of said organopolysiloxane urethane acrylate and 85 to 0 percent of copolymerizable ethylenically-unsaturated monomers.

Ophthalmic devices which are fabricated from monourethane acrylates of polysiloxane alcohols have high oxygen permeability. A novel process is disclosed for the preparation of these polysiloxanes which have at least one urethane acrylate substituent.

31 Claims, No Drawings

OPHTHALMIC DEVICES FABRICATED FROM URETHANE ACRYLATES OF POLYSILOXANE ALCOHOLS

This application is a continuation-in-part application of U.S. Pat. Ser. No. 489,318, filed Apr. 28, 1983 and now abandoned.

FIELD OF THE INVENTION

This invention relates to ophthalmic devices having high oxygen permeability and to a process for their preparation and more particularly to wettable ophthalmic devices having high oxygen permeability fabricated from monourethane acrylates of polysiloxane alcohols.

BACKGROUND ART

The use of various ophthalmic devices, particularly those useful for application directly on the eye such as contact lenses, are known for the correction of vision difficulties. However, such devices have not been accepted by many people, in part because of the time often required by the eye to become accustomed to their use, the physiological intolerance that sometimes develops often after only short periods of use, or the inadequate visual correction which may be provided by them. Consequently, a great amount of effort has been expended in attempts to solve these problems for the contact lens wearer.

These efforts have included modification in both the design of the lens and the composition of the lens material. Modifications in lens design so as to improve the fit of the lens to the eye have produced only marginal reduction of the physiological intolerance in some people. Modification of the composition of the lens material has also only been partially successful.

Early contact lenses were made from polymethyl methacrylate (PMMA), a hard material that is not water-absorptive. Lenses of PMMA, although they are readily machinable and have excellent optical clarity and durability, have a high level of physiological intolerance for many individuals partly because of the stiffness of the lens and partly because the eye becomes deprived of oxygen due to the low oxygen permeability of the PMMA.

Lenses of soft water-absorptive hydrogel materials which bind free water, such as poly(2-hydroxyethyl methacrylate) or poly(vinylpyrrolidone), cause less irritation but at the cost of reduced visual acuity and greatly increased maintenance of the lenses. When such hydrogel lenses are hydrated, they also have a high oxygen permeability and generally are, therefore, comfortable to wear. However, the hydrated lenses have poor durability and exhibit a tendency to become cloudy due to adsorption of proteinaceous and lipid materials.

Lenses of silicone rubber are easily molded, are said to possess a softness similar to that of the upper lid of the human eye and have a high permeability to oxygen. However, contact lenses of silicone rubber may cause a burning sensation in the eye because of the low thermal conductivity of silicone rubber. Also, such lenses have been reported to sometimes tighten over the cornea in a "suction cup" fashion that impedes movement of the lens. This permits entrapment of toxic products and debris under the lenses and prevents tears from washing away this debris and lubricating the eyes, thereby causing abrasion of the eye. Furthermore, silicone rubber, being lipophilic, mucophilic, and inherently non-wettable, attracts debris, e.g., proteins, lipids, mucoids, and the like.

Ophthalmic devices such as contact lenses have also been fabricated from polysiloxane derivatives. U.S. Pat. No. 4,136,250 discloses a water-insoluble hydrophilic gel suitable for contact lenses that is a copolymer of 10 to 80 percent polyolefinic polysiloxane monomers and 90 to 20 percent hydrophilic monomers. The polyolefinic polysiloxane monomers are prepared, in one embodiment, by reaction of a polysiloxane polyol with a diisocyanate followed by reaction with a hydroxyalkyl acrylate. By such means, polyolefinic polysiloxane monomers are obtained which have in each ethylenically-unsaturated group two urethane groups.

U.S. Pat. No. 4,277,595 teaches shaped articles including contact lenses that are fabricated from a copolymer of acrylic acid and poly(organosiloxane) terminated by an activated unsaturated group, such as methacryloxy, acryloxy, or acrylamido. However, this reference also discloses that polysiloxanes having diurethane linkages, i.e.,

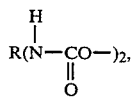

are undesirable for use in medical devices, particularly contact lenses (see col. 2, lines 57–67). It is implied that such a diurethane linkage imparts hydrolytic instability to the lens, i.e., it is degraded by water.

Further, U.S. Pat. No. 4,259,467, which discloses contact lenses made from polymers of polysiloxane having pendent hydrophilic groups, e.g. polyoxyalkylene, amido, and the like, states in col. 2, lines 39–47, that a polysiloxane incorporating a monourethane linkage, i.e.,

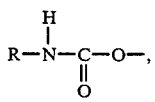

is likewise undesirable for use in medical devices, particularly contact lenses.

U.S. Pat. No. 3,808,178 discloses hard contact lenses that are prepared from a copolymer of a low molecular weight polysiloxanylalkyl methacrylate and an alkyl acrylate that can be made wettable to some degree by the incorporation of 0.1 to 10 percent by weight of one or more hydrophilic monomers. Such contact lenses have low oxygen permeability.

U.S. Pat. No. 4,261,875 teaches hydrophilic contact lenses made from polymers of a polysiloxane having a plurality of pendent hydroxyalkyl groups and at least one ethylenically-unsaturated group.

DISCLOSURE OF THE INVENTION

It has been found that shaped articles, particularly ophthalmic devices, can be fabricated from oxygen transmissive, wettable, hydrolytically stable, polysiloxane copolymers of poly(organosiloxane) monomers having monourethane acrylate groups and copolymerizable ethylenically-unsaturated monomers. The devices can be prepared by direct casting into suitably shaped molds or by machining of lens blanks. Such devices are particularly suitable as contact lenses since they are hydrolytically stable and in some cases resist adsorption of tear components. This is a surprising result in view of the above-mentioned prior art which teaches that polysiloxanes having urethane linkages are undesirable for medical devices, particularly contact lenses.

The shaped articles of the present invention comprise polymers of an addition-polymerizable monomer composition comprising by weight a. 15 to 100 percent by weight of at least one organopolysiloxane urethane acrylate monomer selected from compounds having the formula

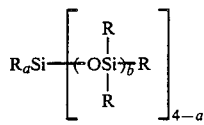
I wherein each R is independently an alkyl group having 1 to 6 carbon atoms, a cycloalkyl group having from 3 to 6 carbon atoms, a phenyl group, a hydroxyalkyl group having 1 to 12 carbon atoms, a (polyalkoxyl)alkyl group having 1 to 3 alkoxy groups in which each alkyl group has 1 to 3 carbon atoms, or $R^1$;

wherein $R^1$ is an acryl- or methacryloyloxyalkyl carbamoyloxyalkyl group having the formula,

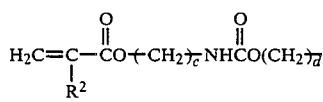

in which $R^2$ is hydrogen or a methyl group, c is an integer of 2 to 6, and d is an integer of 1 to 12;
a is zero, one, or two, but preferably is two;
b is a number having an average value from 2 to 100 such that when considered with the value of "a" provides a molecular weight to the organopolysiloxane urethane acrylate of between 500 and 20,000;
provided that at least 75 percent of all R groups are methyl and at least one of the R groups is an $R^1$ group, preferably two of the R groups are terminal $R^1$ groups, and no more than 25 percent of the R groups are $R^1$ groups; and b. 85 to 0 percent by weight of one or more ethylenically-unsaturated comonomers copolymerizable with the organopolysiloxane urethane acrylate.

Ethylenically-unsaturated comonomers can improve the wettability as well as control certain physical properties of the lens polymer, such as hardness, softness, and toughness. Comonomers useful in the present invention include hydrophilic-group-containing monomers, monomers having only one ethylenically-unsaturated group, and monomers having more than one ethylenically-unsaturated group, referred to as "first", "second", and "third" polymerizable monomers, respectively, and described below.

Preferably, the organopolysiloxane urethane acrylates have the formula

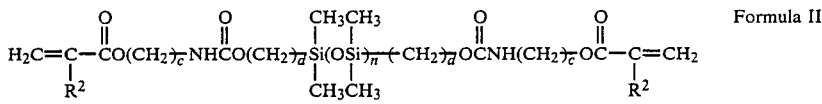
Formula II in which $R^2$, c, and d are as defined above, and n is a number having an average value from 15 to 50.

Preferably, the shaped articles of the invention comprise copolymers of compositions containing 25 to 90 percent of said organopolysiloxane urethane acrylate monomer and 75 to 10 percent of said copolymerizable ethylenically-unsaturated monomer.

More preferably, the shaped articles are ophthalmic devices, such as contact lenses, and comprise copolymers prepared from a monomer composition of (a) 30 to 80 percent, and most preferably 35 to 60 percent, by weight of said organopolysiloxane urethane acrylate, (b) 0 to 60 percent, preferably 2 to 20, and most preferably 5 to 20, percent by weight of a first ethylenically-unsaturated copolymerizable monomer having a hydrophilic group, and (c) 0 to 70 percent, preferably 35 to 68 percent, by weight of ethylenically-unsaturated, non-hydrophilic group-containing copolymerizable monomers selected from (1) a second copolymerizable monomer having one ethylenically-unsaturated group, and
(2) a third copolymerizable monomer having more than one ethylenically-unsaturated group.

As used in the present application:

"ophthalmic device" is used in its usual sense and includes corneal implants, corneal transplants, intraocular lenses and contact lenses;

"acrylate" means an acrylate or methacrylate group;

"organopolysiloxane urethane acrylate" means an organopolysiloxane substituted by one or more acryl- or methacryloyloxyalkylcarbamoyloxyalkyl groups;

"polysiloxane alcohol" includes both polysiloxane monools and polysiloxane polyols that are polysiloxane compounds having at least one hydroxyl group bonded to a carbon atom of an alkyl chain that is bonded to a silicon atom;

"oxygen permeable" means having a capability to permit the passage of oxygen at least to the extent of 5 Barrers when measured in accordance with the polarographic oxygen electrode method described by M. F. Refojo et al, "Permeability of Dissolved Oxygen Through Contact Lenses - 1. Cellulose Acetate Butyrate", *Cont. Intraocular Lens Med. J.* 3(4), 27 (1977);

"wettable" or "wettability" relates to the spreading of a liquid on a surface and means an ophthalmic device having a water contact angle below 60°;

"hydrolytically stable" means not degraded by contact with water for prolonged periods of time; and "hydrophilic group-containing monomer" means one that enables a surface to be wettable by an aqueous solution; and "non-hydrophilic group-containing monomer" means one that does not contain a hydrophilic group.

DETAILED DESCRIPTION

The shaped articles of the present invention exhibit an oxygen permeability of at least 5 Barrers. Preferably the devices of the invention exhibit an oxygen permeability of at least 10 Barrers, and most preferably an oxygen permeability of at least 15 Barrers.

Organopolysiloxane urethane acrylates useful in the invention can be prepared by the reaction of isocyanatoalkyl acrylates or methacrylates with an organopolysiloxane that has pendent, preferably terminal, hydroxyalkyl groups. Organopolysiloxanes having pendent hydroxyalkyl groups that are suitable for use in the urethane acrylates are known and are described, for example, in the beforementioned U.S. Pat. No. 4,261,875. Organopolysiloxanes having terminal hydroxyalkyl groups are prepared by the platinum catalyzed reaction of a silicon hydride-terminated polysiloxane with an hydroxy-group-protected -alkenyl alcohol forming an organopolysiloxane having protected terminal hydroxy groups that on removal yield the desired organopolysiloxane having terminal hydroxyalkyl groups. The preparation of such organopolysiloxane urethane acrylates is illustrated by the following equations for the preparation of poly(dimethylsiloxane)α,ω-bis(urethane methacrylate):

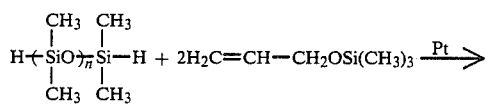

III

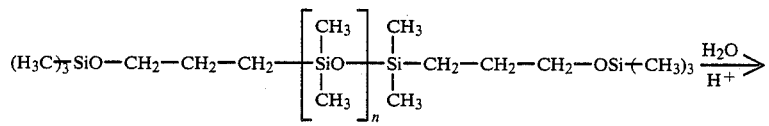

IV

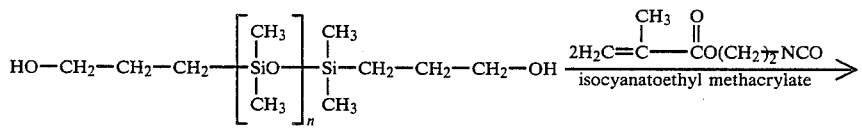

V

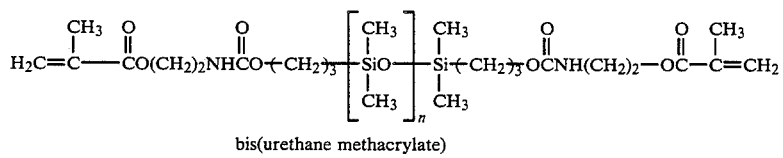

bis(urethane methacrylate)

VI wherein n has an average value from 15 to 50.

The polysiloxanes of the present invention which have at least one urethane acrylate group and have the formula:

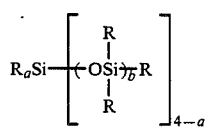

I can be prepared by a process comprising the steps of:

a. reacting an organopolysiloxane polyol having the formula

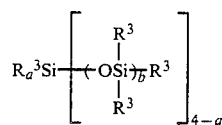

wherein each $R^3$ is independently an alkyl group having 1 to 6 carbon atoms, a cycloalkyl group having from 3 to 6 carbon atoms, a phenyl group, a (polyalkoxyl)alkyl group having 1 to 3 alkoxy groups in which each alkyl group has 1 to 3 carbon atoms, or $R^4$;

wherein $R^4$ is

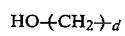

a is zero, one, or two, but preferably is two;

b is a number having an average value from 2 to 100 such that when considered with the value of "a" provides a molecular weight to the organopolysiloxane polyol of between 500 and 20,000; and d is an integer of 1 to 12; provided that at least 75 percent of all $R^3$ groups are methyl and at least one of the $R^3$ groups is an $R^4$ group, preferably two of the $R^3$ groups are terminal $R^4$ groups, and no more than 25 percent of the $R^3$ groups are $R^4$ groups;

with an amount of acryl- or methacryloyloxyalkyl isocyanate compound sufficient to completely esterify at least one, preferably two, hydroxyl groups present, said compound having the formula

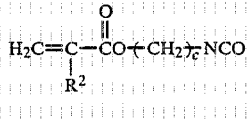

wherein

R² is hydrogen or a methyl group and c is an integer of 2 to 6;

b. cooling the resulting organopolysiloxane urethane acrylate for a time and at a temperature (e.g., at 0° C. and for 1 to 5 days) sufficient to precipitate insoluble material, and c. recovering the organopolysiloxane urethane acrylate free of precipitated material.

A variety of comonomers are useful for copolymerization with the organopolysiloxane urethane acrylate. Such comonomers are characterized by having polymerizable ethylenically-unsaturated groups and can impart specific properties to the resulting copolymer. Wettability is a very desirable characteristic for ophthalmic devices such as contact lenses in order to provide comfort and good visual acuity. Wettability can be improved (i.e., water contact angle brought to below about 60°) in a number of ways. For example, the organopolysiloxane urethane acrylate can be polymerized with from about 0.01 to 60 parts by weight of the total weight of the polymerization mixture of a copolymerizable ethylenically-unsaturated monomer designated "first copolymerizable monomer", that has a hydrophilic group such as, for example, a hydroxy, carboxy, carbonamido, sulfonyl, or a sulfonamido group. Representative examples of useful "first copolymerizable monomers" include 2-hydroxyethyl acrylate and methacrylate, 3-hydroxypropyl acrylate, 4-hydroxybutyl acrylate, 5-hydroxypentyl acrylate, 2,3-dihydroxypropyl acrylate and methacrylate, N-vinyl-2-pyrrolidone, 2-carboxyethyl acrylate, 2-carbonamidoethyl methacrylate, 2-sulfoethyl methacrylate, 2-sulfonamidoethyl acrylate, vinylsulfonic acid, and mixtures thereof.

Another technique, which is preferred, for improving the wettability of the devices of the invention involves subjecting the surface of the device to the action of a glow discharge (e.g., in an air, oxygen, nitrogen, water vapor, etc. atmosphere) at a low pressure (e.g. 0.05 to 5 Torr) for from about one second or less to 5 minutes, preferably about 0.5 to 2 minutes, in accordance with the disclosure in U.S. Pat. No. 3,940,207. This treatment can be followed by exposure to water vapor at ambient pressure at 20° to 30° C. for a time period of at least 0.5 hour, preferably about 0.5 to 6 hours. The glow discharge and optional water vapor treatments can be particularly desirable in cases where individuals have tear components that cause clouding of contact lenses.

As to useful non-hydrophilic group-containing comonomers having only one ethylenically-unsaturated group designated "second copolymerizable monomers", representative examples include methyl and ethyl acrylate, methyl and ethyl methacrylate, cyclohexyl methacrylate, methyl 2-chloroacrylate, 2-ethoxyethyl methacrylate, 2,2,2-trifluoroethyl methacrylate, 2-cyanoethyl methacrylate, 2-(N-methylcarbamoyloxy)ethyl acrylate and methacrylate, acrylic acid, methacrylic acid, styrene, methylstyrene, t-butylstyrene, vinylidene chloride, vinylidene fluoride, vinyl silanes and vinyl siloxanes, e.g., methacryloyloxypropyl-tris(trimethylsiloxy)silane and methacryloyloxymethylpentamethyldisiloxane, and mixtures of two or more of these materials. Particularly preferred comonomers include methyl methacrylate, ethyl methacrylate, cyclohexyl methacrylate, and t-butylstyrene. "Second copolymerizable monomers" contribute stiffness and physical strength to the resulting copolymers.

A variety of other ingredients may be included in the polymerization mixture so as to either enhance or provide specific properties. For example, the dimensional stability of the devices of the invention may be enhanced by including in the polymerization mixture from about 0.5 to 25 parts by weight of a "third polymerizable monomer", i.e., a non-hydrophilic group-containing monomer having more than one ethylenically-unsaturated group, per 100 parts by weight of a polymerization mixture. Representative examples of useful "third polymerizable monomers" include ethyleneglycol diacrylate, ethyleneglycol dimethacrylate, diethyleneglycol dimethacrylate, tetraethyleneglycol dimethacrylate, allyl methacrylate, trimethylolpropane trimethacrylate, divinyl benzene, diallyl phthalate, and the polyacrylate and polymethacrylate esters of isocyanuric acid and s-triazine (e.g., tris(2-acryloyloxyethyl)isocyanurate [available as "SR ®-368" from Sartomer Co., West Chester, Pa.] and 1,3,5-tri(2-methacryloxyethyl)- s-triazine.

The polymerization of the organopolysiloxane urethane acrylate compositions may be carried out by employing initiators which generate free radicals on application of activating energy as is conventionally used in the polymerization of ethylenically-unsaturated monomers. Included among free radical initiators are the conventional thermally activated initiators such as organic peroxides and organic hydroperoxides. Representative examples of initiators include benzoyl peroxide, tertiary-butyl perbenzoate, diisopropyl peroxydicarbonate, cumene hydroperoxide, azobis(isobutyronitrile), and the like. Generally, from about 0.1 to 5 percent by weight of thermal initiator is used.

Photoinitiators may also be employed to initiate polymerization. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and α-methylbenzoin; diketones such as benzyl and diacetyl, etc.; ketones such as acetophenone, α,α,α,-trichloroacetophenone, 2-hydroxy-2-methyl-1-phenyl-1-propanone, o-nitro-α,α,α-tribromoacetophenone; benzophenone and p,p'-tetramethyldiaminobenzophenone; α-acyloxime esters such as benzyl (0-ethoxycarbonyl)-α-monoxime; ketone/amine combinations such as benzophenone/N-methyldiethanolamine, benzophenone/tributylamine and benzophenone/Michler's ketone; and ketals such as 2,2-dimethoxyacetophenone, 2,2-diethoxyacetophenone (DEAP), benzil dimethylketal, benzil diethylketal and 2,5-dichlorobenzil dimethylketal. Normally, the photoinitiator is used in amounts ranging from about 0.01 to 5 percent by weight of the total oligomeric composition. When the quantity is less than 0.01 percent by weight, the photopolymerization rate becomes extremely low. If the photoinitiator is used in excess of 5 percent by weight no correspondingly improved effect is observed. Preferably, about 0.05 to 1.0 percent of photoinitiator is used in the polymerizable compositions.

Polymerization may be carried out in bulk in a conventional manner. When the activating energy is ultraviolet light, the irradiation is typically carried out at a temperature of about 0° to 50° C. for 0.5 to 5 hours or more. Following ultraviolet irradiation, the composition may be heated at 50° to 100° C. to complete the polymerization.

When the activating energy is only heat, polymerization is usually carried out at a temperature from about 40° to 140° C. for about 1 to 50 hours. The polymerization can also be carried out in stages. For example, the composition may be heated at 40° to 60° C. for about 1 to 25 hours, and then the temperature raised to 50° to 100° C. for 5 to 25 hours. It is to be understood, of course, that the polymerization conditions are not limited to such temperature and time conditions nor to the use of ultraviolet radiation or heat as the initiating energy.

The shaped articles of the invention may be provided by supplying a mold of the desired configuration, charging the organopolysiloxane urethane acrylate composition thereto, and causing polymerization to take place therein by, for example, one of the techniques previously described. Devices having the desired final configuration may be obtained in this manner. The resultant device may be machined and/or polished if desired using techniques known to the art. Where the shaped article is a contact lens, it is preferred that the surface be treated by glow discharge at a low pressure and optionally by water vapor to increase surface wettability, as described above.

Alternatively, the devices of the invention may be provided by polymerizing the organopolysiloxane urethane acrylate composition into a rod, block, or sheet followed by cutting the device therefrom. This technique is useful when the polymerization product contains at least about 30 weight percent of a compatible ethylenically-unsaturated comonomer copolymerizable with the organopolysiloxane urethane acrylate.

In another method, shaped articles can be prepared by spin casting as is described, for example, in U.S. Pat. No. 3,408,429 and requires that polymerization in the presence of a crosslinking agent be carried out in a rotating mold which approximates the shape of the desired article. After polymerization the article is further processed if necessary to attain the final shape.

The present invention is further described in the following representative examples. All temperatures are given in degrees Centigrade and all parts are given in parts by weight unless otherwise stated. The particular materials and amounts thereof recited in these examples, as well as other conditions and details, should not be construed to unduly limit this invention. "Submerged Wetting Angle" of polymers prepared is measured in accordance with the CLMA Industry accepted reference procedure for determining wetting angle, adopted February 1981; Contact Lens Manufacturers Assoc., 435 N. Michigan Ave., Chicago, Ill. 60611.

Organopolysiloxane urethane acrylates (designated "PSUA A," "PSUA B", etc.) were prepared as follows:

Preparation of PSUA A (1) Preparation of poly(dimethylsiloxane) having terminal silicon hydride groups.

A mixture of 122.4 g octamethylcyclotetrasiloxane; 13.4 g tetramethyldisiloxane, 0.7 g activated charcoal powder, and 0.07 g conc. sulfuric acid was agitated and heated at 65° C. for 24 hours. The mixture was then filtered and the filtrate subjected to a reduced pressure of about 0.2 Torr while heating at 70° C. for 48 hours on a rotary evaporator. The resulting colorless liquid was a linear poly(dimethylsiloxane) that had a number average molecular weight of about 1650 and terminal silicon hydride groups as determined by NMR spectroscopy.

(2) Preparation of organopolysiloxane having terminal hydroxyalkyl groups.

Into a suitable reaction vessel equipped with stirrer, thermometer and apparatus for maintaining an inert atmosphere was placed 142 g (0.086 moles) of the above prepared silicon hydride terminated poly(dimethylsiloxane), 26.6 g (0.2 moles) of allyloxytrimethylsilane, and 130 ml of toluene. The mixture was stirred under dry nitrogen and an oil bath at 60° C. placed about the vessel. When the temperature of the contents of the vessel reached 40° C., there was added 2 drops of a solution in divinyltetramethyldisiloxane of a platinum complex, the solution containing 26 percent by weight of platinum (the catalyst solution was prepared in accordance with Example 1 of U.S. Pat. No. 3,775,452). An exothermic reaction occured raising the temperature of the mixture to over 80° C. The temperature then slowly dropped to 60° C. where it was held for an additional two hours. Volatile material was then removed from the reaction mixture by vacuum distillation leaving as residue the poly(dimethylsiloxane) having terminal trimethylsiloxypropyl groups of Formula IV.

A mixture of 149 g of the above prepared poly(dimethylsiloxane) having terminal trimethylsiloxypropyl groups, 300 ml of tetrahydrofuran, and 300 ml of 0.1N HCl was stirred vigorously at about 25° C. for 5 hours. The reaction mixture was extracted with diethyl ether. After removal of volatile material by vacuum distillation, a residue of poly(dimethylsiloxane) having terminal hydroxypropyl groups having Formula V was obtained.

(3) Preparation of organopolysiloxane having terminal urethane acrylate groups.

A mixture of 138 g of the above prepared poly(dimethylsiloxane) having terminal hydroxypropyl groups, 25.3 g of 2-isocyanatoethyl methacrylate (IEM) and 10 drops of stannous octoate was stirred under nitrogen and heated at 60° C. for 24 hours. During the reaction period, the presence of the isocyanate group as indicated by a 2260 $cm^{-1}$ peak was monitored by infrared spectroscopy. On observing disappearance of the isocyanate peak, about one gram increments of IEM were added until the isocyanate peak persisted, whereon 10 ml of tetrahydrofuran and 0.1 ml of water were added and the mixture stirred for an additional hour. Infrared spectroscopy confirmed the absence of the isocyanate group. The reaction mixture was then decolorized by adding 150 ml of hexane and 1.5 g of decolorizing carbon and stirring for five or more hours. On filtration and vacuum distillation of volatiles, linear poly(dimethylsiloxane) having terminal 3-[2-(methacryloyloxy)ethylcarbamoyloxy]propyl groups was obtained. This compound was stored at 0° C. for about 3 days. Unexpectedly a solid material precipitated from the cooled liquid residue and it was separated by filtration and identified as N,N',2-tris(methacryloyloxyethyl)imidocarbonic diamide. The filtrate was termed PSUA A. It had the structure shown by Formula VI in which n had a value of about 22.

Preparation of PSUA B, PSUA C, AND PSUA D

The procedure for the preparation of PSUA A was repeated using 235 g instead of 122.4 g of octamethylcyclotetrasiloxane. There was obtained a linear poly(-dimethylsiloxane) having terminal 3-[2-(methacryloyloxy)ethylcarbamoyloxy]propyl groups. It had a structure as shown by Formula VI in which n had a value of about 35 and was termed PSUA B.

By adjusting the amounts of octamethylcyclotetrasiloxane, linear poly(dimethylsiloxane) compounds having terminal 3-[2-(methacryloyloxy)ethylcarbamoyloxy]propyl groups were obtained in which n had an average value of 16 and 29 that were termed PSUA C and PSUA D, respectively.

EXAMPLE I

A mixture of 38 parts of PSUA A, 47 parts of methylmethacrylate, 10 parts of 2-hydroxyethyl methacrylate, 5 parts of ethyleneglycol dimethacrylate and 0.5 parts of a photoinitiator, 2-hydroxy-2-methyl-1-phenyl-1-propanone (Darocure® 1173, E. Merck and Co.), was freeze-thaw degassed in vacuo three times to give a clear colorless solution. Into a glass vial, 13 mm in diameter was placed seven grams of this solution under a nitrogen atmosphere and the vial rotated slowly while being exposed for one hour at a distance of 18.7 cm to the radiation from a 275 W Sunlamp (G.E. Model RSM). The resulting cured copolymer rod was removed from the vial and cut into wafers which were machined into optically clear colorless contact lenses. These lenses had an oxygen permeability of 15 Barrer and a submerged wetting angle of 51 degrees.

EXAMPLE II

A solution of 60 parts of PSUA B, 40 parts of methyl methacrylate, and 0.50 parts (0.5 percent by weight) 2,2-diethoxyacetophenone (DEAP) was degassed in vacuo using a freeze-thaw process. A portion of this solution was injected with a syringe into a 125 mm × 125 mm mold made by assembling a 300 micrometer spacer between two glass plates having a sheet of 62.5 micrometer thick film of poly(ethylene terephthalate) attached to the inner glass surfaces. The mold also had small channels at the top to permit loading and to allow the escape of bubbles. The filled mold was exposed for 30 minutes to the radiation of a medium pressure ultraviolet lamp. The solution polymerized to an optically clear transparent sheet which was readily removed from the mold. The copolymer sheet had an oxygen permeability of 57 Barrers, a tensile strength of 10.7 MPa (1550 psi), and a modulus of 145 MPa (21,000 psi) as measured according to ASTM D-882-79.

EXAMPLE III

Using a solution of 50 parts of PSUA-B, 50 parts of methyl methacrylate, and 0.5 parts of DEAP in the procedure of EXAMPLE II, a transparent film having an oxygen permeability of 46 Barrers, a tensile strength of 15.2 MPa (2,200 psi) and a modulus of 236 MPa (34,250 psi) was obtained.

EXAMPLE IV

This example shows the preparation and copolymerization of an organopolysiloxane urethane methacrylate having pendent hydroxypropyl groups. To 10 g of a trimethylsilyloxy end-capped, linear polysiloxane having about ten dimethylsiloxane units and ten 3-hydroxypropylmethyl siloxane units, which was stirred under nitrogen and cooled to 10° C., was added 2.4 g of 2-isocyanatoethyl methacrylate and 0.012 g of dibutyltin dilaurate catalyst. The mixture was stirred at room temperature for seven hours. A clear trimethylsilyloxy end-capped polysiloxane having about ten dimethylsiloxane units, eight 3-hydroxypropylmethyl siloxane units and two 3-[2-(methacryloyloxy)ethylcarbamoyloxy]propylmethyl siloxane units free from isocyanate groups was obtained.

Using the procedure shown in Example II for photopolymerization, a degassed solution of 6 g of the above polysiloxane urethane methacrylate, 4 g of methyl methacrylate and 0.03 g of diethoxyacetophenone was irradiated in the glass mold for 1 hour using a medium pressure ultraviolet lamp. A clear film was obtained having an oxygen permeability of 14 Barrers, a tensile strength of 10.5 MPa (1530 psi) and a modulus of 276 MPa (40,000 psi). The film had a submerged water contact angle of 70°.

EXAMPLE V–XIII

In accordance with the general procedure of Example II, there were prepared sheets of polymers of the addition-polymerizable monomer composition of the invention in which varying amounts of different PSUAs with varying amounts of combined methyl methacrylate (MMA) (or t-butyl styrene), hydroxyethyl methacrylate (HEMA), and ethylene glycol dimethacrylate (EDMA) were employed. The tensile strength, tensile modulus, oxygen permeability, and wetting angle of each of the sheets were determined and are given in TABLE I.

TABLE I

| Ex. | PSUA | n Formula VI | Wt % | MMA | HEMA | EDMA | Tensile strength $MP_a$ | Tensile modulus $MP_a$ | $P^{(2)}O_2$ (Barrers) | Wetting angle (degrees) |
|-----|------|--------------|------|-----|------|------|-------------------------|------------------------|------------------------|--------------------------|
| V    | D | 29 | 35   | 50      | 10 | 5 | 27.6 | 724 | 14 | 52 |
| VI   | D | 29 | 35   | 50(1)   | 10 | 5 | 26.2 | 828 | 21 | 58 |
| VII  | A | 22 | 32.5 | 52.5(1) | 10 | 5 | 27.6 | 724 | 19 | 61 |
| VIII | A | 22 | 37.5 | 42.5    | 20 | 0 | 25.5 | 552 | 9  | 44 |
| IX   | A | 22 | 32.5 | 52.5    | 10 | 5 | 30.3 | 690 | 10 | 50 |
| X    | C | 16 | 46   | 37      | 10 | 7 | 23.1 | 324 | 32 | 50 |
| XI(3)| B | 35 | 50   | 50      | 0  | 0 | 15.2 | 236 | 46 | — |

TABLE I-continued

| Ex. | PSUA | n Formula VI | Wt % | Percent by weight MMA | HEMA | EDMA | Tensile strength MP$_a$ | Tensile modulus MP$_a$ | P$^{(2)}$O$_2$ (Barrers) | Wetting angle (degrees) |
| --- | --- | --- | --- | --- | --- | --- | --- | --- | --- | --- |
| XII[4] | B | 35 | 60 | 40 | 0 | 0 | 10.7 | 145 | 57 | — |

[1] t-butylstyrene in place of methyl methacrylate
[2] permeability of oxygen
[3] same as Example III
[4] same as Example II The data in TABLE I show that with increase in the concentration of PSUA in the polymerizable composition there was an increase in the oxygen permeability and an essentially corresponding decrease in the tensile modulus of cast sheets of the polymers obtained from the composition. It is also apparent from TABLE I that compositions containing t-butylstyrene gave polymers having oxygen permeability substantially higher than that of identical compositions having methyl methacrylate instead of t-butylstyrene.

EXAMPLES XIII–XIX

An indication of the hydrolytic stability of the optical articles of the invention was determined by measuring the change in tensile strength and tensile modulus of 300 micrometer thick films of PSUA copolymers before and after they were boiled in water (100° C.) for seven days. For use in the test, a series of films were prepared according to the procedure described in Example II which contained from 30 to 45 percent by weight of PSUA-A. The before and after tensile strength and moduli data given in TABLE II, below were the average and standard deviation of three samples for each of these determinations.

TABLE II

| Ex. No. | Weight Percent PSUA-A | MMA | HEMA | Before[1] Tensile Strength MPa | Tensile Modulus MPa | After[1] Tensile Strength MPa | Tensile Modulus MPa |
| --- | --- | --- | --- | --- | --- | --- | --- |
| XIII | 30 | 55 | 15 | 31 ± 0.7 | 700 ± 10 | 38.6 ± 0.3 | 720 |
| XIV | 37.5 | 42.5 | 20 | 25.5 ± 0.7 | 550 ± 70 | 32.4 ± 0.3 | 460 |
| XV | 37.5 | 47.5 | 15 | 27.5 ± 0.7 | 520 ± 52 | 31.0 ± 0.7 | 570 ± 17 |
| XVI | 37.5 | 52.5 | 10 | 29.0 ± 1.4 | 700 ± 120 | 31.7 ± 0.7 | 555 ± 69 |
| XVII | 45 | 35 | 20 | 22.7 ± 0.3 | 280 ± 103 | 25.5 ± 0.3 | 410 ± 10 |
| XVIII | 45 | 40 | 15 | 23.4 ± 0.7 | 410 ± 17 | 26.2 ± 1.4 | 405 ± 10 |
| XIX | 45 | 45 | 10 | 23.4 ± 2.0 | 480 ± 86 | 25.5 ± 0.7 | 440 ± 28 |

[1] Tensile properties of the PSUA copolymer sheets "before" and "after" having been boiled in water (100° C.) for seven days.

The data of TABLE II show that there was no statistically significant decrease in tensile strength or modulus by boiling the sheets in water for seven days, indicating that the sheets were hydrolytically stable under these conditions.

EXAMPLE XX COMPARATIVE EXAMPLE

An organopolysiloxane methacrylate was prepared and polymerized to provide a polymer for comparison of its suitability for use as a contact lens with the contact lenses of the invention that were prepared from an organopolysiloxane urethane acrylate.

A mixture of 38.17 g octamethylcyclotetrasiloxane, 7.73 g bis(methacryloyloxypropyl)tetramethyldisiloxane, 0.22 g activated charcoal powder, and 0.02 g concentrated sulfuric acid was agitated and heated at 65° C. for 22 hours. The mixture was then filtered and the filtrate subjected to a reduced pressure of about 0.2 Torr while being heated at 65° C. for 24 hours on a rotary evaporator. The resulting colorless liquid was a linear poly(dimethylsiloxane) that had a number average molecular weight of about 2090 and terminal methacryloyloxypropyl groups as determined by NMR spectroscopy.

A solution of 7.2 g of the organopolysiloxane methacrylate as prepared above, 8.1 g methyl methacrylate, 0.85 g ethyleneglycol dimethacrylate, 0.85 g hydroxyethyl methacrylate, and 0.08 g Darocure ™ 1173 was degassed, cast into a mold, and polymerized as described in Example II. A cloudy sheet was obtained indicating the composition to be unsatisfactory for use in contact lenses.

A sheet prepared as above, but using PSUA A, an organopolysiloxane urethane acrylate, in place of the nonurethane group-containing organopolysiloxane methacrylate was clear and transparent and very satisfactory for use in contact lenses.

EXAMPLE XXI

A solution of 32.5 parts PSUA A, 54.5 parts of cyclohexyl methacrylate, 3 parts of ethyleneglycol dimethacrylate, 10 parts of hydroxyethyl methacrylate, 0.5 parts of a peroxide initiator (Lupersol 256 ™, Pennwalt) and 0.01 parts of D & C Green #6 dye, (H. Kohnslamm & Co.), was freeze-thaw degassed in vacuo three times. Under a nitrogen atmosphere, this solution was used to fill multiple cavities in a Teflon ™ mold, which cavities comprise holes about 1.6 cm diameter and about 1.6 cm deep. The filled mold was covered with a glass plate and was held in an oven under a nitrogen atmosphere while the temperature was adjusted to 50° C. The polymer buttons were cured by keeping the oven temperature at 50° C. for 4 hours, then raising it to 60° C. over 10 hours, then raising it to 120° C. over 12 hours, then holding at that temperature for 24 hours, then lowering it to 30° C. over 9 hours.

The resulting buttons were removed from the mold and lathe cut into contact lenses using techniques standard in the industry. The lenses were exposed to a glow discharge in water vapor at 300 micrometers pressure at 620 volts of 60 Hz alternating current for 60 seconds. This treatment was similar to the so-called "Gesser process", disclosed in U.S. Pat. No. 3,925,178. The resulting lenses were fitted in human subjects and exhibited excellent optics, wettability and comfort.

EXAMPLE XXII

Lenses were prepared as in Example XXI, except that they were treated with a glow discharge in an oxygen atmosphere, followed by exposure to water vapor for 3 hours. This process is similar to the so-called "Agfa process", disclosed in U.S. Pat. No. 3,959,105. The resulting lenses were fitted in human subjects and exhibited excellent optics, wettability and comfort.

Various modifications and alterations of this invention will become apparent to those skilled in the art without departing from the scope and spirit of this invention, and it should be understood that this invention is not to be unduly limited to the illustrative embodiments set forth herein.

We claim:

1. An ophthalmic device comprising an addition polymer which is the reaction product of a composition comprising:
   (a) 15 to 100 percent by weight of at least one organopolysiloxane urethane acrylate having the formula

   I wherein each R is independently an alkyl group having 1 to 6 carbon atoms, a cycloalkyl group having from 3 to 6 carbon atoms, a phenyl group, a hydroxyalkyl group having 1 to 12 carbon atoms, a (polyalkoxyl)alkyl group having 1 to 3 alkoxy groups in which each alkyl group has 1 to 3 carbon atoms, or $R^1$;
   wherein $R^1$ is an acryl- or methacryloyloxyalkyl carbamoyloxyalkyl group having the formula,

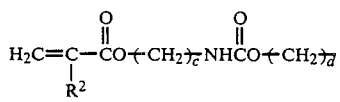

in which $R^2$ is hydrogen or a methyl group, c is an integer of 2 to 6, and d is an integer of 1 to 12;
   a is zero, one, or two;
   b is a number having an average value from 2 to 100 such that when considered with the value of "a" provides a molecular weight to the organosiloxane urethane acrylate of between 500 and 20,000;
   provided that at least 75 percent of all R groups are methyl and at least one of the R groups is an $R^1$ group, and no more than 25 percent of the R groups are $R^1$ groups; and
   (b) 85 to 0 percent by weight of one or more ethylenically-unsaturated comonomers copolymerizable with the organopolysiloxane urethane acrylate.

2. The device according to claim 1 wherein said organopolysiloxane urethane acrylate has the formula

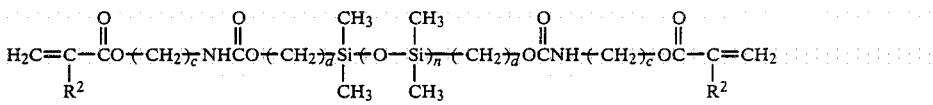

in which $R^2$, c, and d are as defined for Formula I, and n is a number having an average value from 15 to 50.

3. The device of claim 1 wherein said polymer is the reaction product of 25 to 90 percent by weight of the organopolysiloxane urethane acrylate of Formula I and 75 to 10 percent by weight of one or more of the ethylenically-unsaturated comonomers.

4. The device according to claim 1 wherein said polymer is the reaction product of 30 to 80 weight percent of said organosiloxane urethane acrylate and said ethylenically-unsaturated comonomers which comprise
   (a) 0 to 60 weight percent of a first ethylenically-unsaturated copolymerizable monomer having a hydrophilic group, and
   (b) 0 to 70 weight percent of ethylenically-unsaturated non-hydrophilic group-containing copolymerizable monomers selected from
      (1) a second polymerizable monomer having one ethylenically-unsaturated group, and
      (2) a third polymerizable monomer having more than one ethylenically-unsaturated group.

5. The device according to claim 4 wherein said polymer is derived from said first ethylenically-unsaturated copolymerizable monomer which is present in the range of 2 to 20 weight percent.

6. The device according to claim 4 wherein said polymer is derived from said first ethylenically-unsaturated copolymerizable monomer which is selected from 2-hydroxyethyl acrylate and methacrylate, 2,3-dihydroxypropyl acrylate and methacrylate, and N-vinyl-2-pyrrolidone, and mixture thereof.

7. The device according to claim 4 wherein said polymer is derived from said second ethylenically-unsaturated copolymerizable monomer which is selected from methyl and ethyl acrylate, methyl and ethyl methacrylate, cyclohexyl methacrylate, methyl 2-chloroacrylate, 2-ethoxyethyl methacrylate, 2,2,2-trifluoroethyl acrylate and methacrylate, 2-cyanoethyl methacrylate, 2-(N-methylcarbamoyloxy)ethyl acrylate and methacrylate, acrylic acid, methacrylic acid, vinylidene chloride, styrene, methylstyrene, t-butylstyrene, vinylidene fluoride, methacryloyloxypropyl-tris(trimethylsiloxy) silane, and methacryloyloxymethylpentamethyldisiloxane, and mixture thereof.

8. The device according to claim 7 wherein said second ethylenically-unsaturated copolymerizable monomer is selected from methyl methacrylate, ethyl methacrylate, cyclohexyl methacrylate, and t-butylstyrene.

9. The device of claim 4 wherein said first copolymerizable monomer is 2-hydroxyethyl methacrylate.

10. The device of claim 4 wherein said first copolymerizable monomer is N-vinyl-2-pyrrolidone.

11. The device of claim 4 wherein said polymer is derived from said third copolymerizable comonomer which is selected from ethyleneglycol diacrylate, ethyleneglycol dimethacrylate, diethyleneglycol dimethacrylate, tetraethyleneglycol dimethacrylate, allyl methacrylate, trimethylolpropane trimethacrylate, divinyl benzene, diallyl phthalate, tris(2-acryloyloxyethyl- )isocyanurate, and 1,3,5-tri(2-methacryloxyethyl)-s-triazine.

12. The device of claim 4 wherein said second ethylenically-unsatuated comonomer is methyl methacrylate.

13. The device of claim 4 wherein said second ethylenically-unsaturated comonomer is t-butylstyrene.

14. The device of claim 1 wherein said polymer is the reaction product of (1) 35 to 60 percent by weight of the organopolysiloxane of Formula I, (2) 5 to 20 percent by weight of the ethylenically-unsaturated, hydrophilic group-containing, comonomer 2-hydroxyethyl methacrylate, and (3) 35 to 60 percent by weight of the ethylenically-unsaturated, non-hydrophilic, group-containing comonomer methyl methacrylate.

15. The device of claim 1 wherein said polymer is the reaction product of (1) 35 to 60 percent by weight of the organopolysiloxane of Formula I, (2) 5 to 20 percent by weight of the ethylenically-unsaturated, hydrophilic group-containing comonomer 2-hydroxyethyl methacrylate, and (3) 35 to 60 percent by weight of the ethylenically-unsaturated, non-hydrophilic, group-containing comomer t-butylstyrene.

16. A contact lens according to claim 1.

17. A process for preparing polysiloxanes which have at least one urethane acrylate group and have the formula:

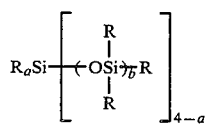

wherein each R is independently an alkyl group having 1 to 6 carbon atoms, a cycloalkyl group having from 3 to 6 carbon atoms, a phenyl group, a hydroxyalkyl group having 1 to 12 carbon atoms, a (polyalkoxyl)alkyl group having 1 to 3 alkoxy groups in which each alkyl group has 1 to 3 carbon atoms, or $R^1$;

wherein $R^1$ is an acryl- or methacryloyloxyalkyl carbamoyloxyalkyl group having the formula,

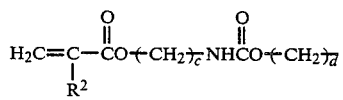

in which $R^2$ is hydrogen or a methyl group, c is an integer of 2 to 6, and d is an integer of 1 to 12;

a is zero, one, or two;

b is a number having an average value from 2 to 100 such that when considered with the value of "a" provides a molecular weight to the organosiloxane urethane acrylate of between 500 and 20,000;

provided that at least 75 percent of all R groups are methyl and at least one of the R groups is an $R^1$ group, and no more than 25 percent of the R groups are $R^1$ groups;

said process comprising the steps of a. reacting an organopolysiloxane polyol having the formula

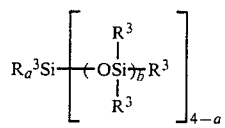

wherein each $R^3$ is independently an alkyl group having 1 to 6 carbon atoms, a cycloalkyl group having from 3 to 6 carbon atoms, a phenyl group, a (polyalkoxyl)alkyl group having 1 to 3 alkoxy groups in which each alkyl group has 1 to 3 carbon atoms, or $R^4$;

wherein $R^4$ is

HO—(CH$_2$)—$d$ a is zero, one, or two;

b is a number having an average value from 2 to 100 such that when considered with the value of "a" provides a molecular weight to the organopolysiloxane polyol of between 500 and 20,000; and d is an integer of 1 to 12;

provided that at least 75 percent of all $R^3$ groups are methyl and at least one of the $R^3$ groups is an $R^4$ group, preferably two of the $R^3$ groups are terminal $R^4$ groups, and no more than 25 percent of the $R^3$ groups are $R^4$ groups;

with an amount of acryl- or methacryloyloxyalkyl isocyanate compound sufficient to completely esterify at least one hydroxyl group present, said compound having the formula

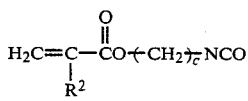

wherein $R^2$ is hydrogen or a methyl group and c is an integer of 2 to 6;

b. cooling the resulting organopolysiloxane urethane acryate for a time and at a temperature sufficient to precipitate insoluble material, and c. recovering the organopolysiloxane urethane acrylate free of precipitated material.

18. A polysiloxane urethane acrylate prepared according to the process of claim 17.

19. The polysiloxane urethane acrylate according to claim 18 which is an ophthalmic device.

20. The device according to claim 2 wherein $R^2$ is methyl, c is 2, and d is 3.

21. The ophthalmic device according to claim 1 wherein two of the R groups of said organopolysiloxane urethane acrylate are terminal $R^1$ groups.

22. The process according to claim 17 wherein two of the $R^3$ groups of said organopolysiloxane polyol are terminal $R^4$ groups.

23. An ophthalmic device comprising an addition polymer which is the reaction product of a composition comprising:

(a) 15 to 100 percent by weight of at least one organopolysiloxane urethane acrylate having the formula

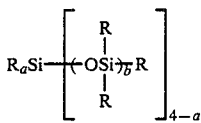

wherein each R is independently an alkyl group having 1 to 6 carbon atoms, a cycloalkyl group having from 3 to 6 carbon atoms, a phenyl group, a hydroxyalkyl group having 1 to 12 carbon atoms, a (polyalkoxyl)alkyl group having 1 to 3 alkoxy groups in which each alkyl group has 1 to 3 carbon atoms, or $R^1$;

wherein $R^1$ is an acryl- or methacryloyloxyalkyl carbamoyloxyalkyl group having the formula,

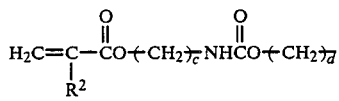

in which $R^2$ is hydrogen or a methyl group, c is an integer of 2 to 6, and d is an integer of 1 to 12;

a is zero, one, or two;

b is a number having an average value from 2 to 100 such that when considered with the value of "a" provides a molecular weight to the organosiloxane urethane acrylate of between 500 and 20,000;

provided that at least 75 percent of all R groups are methyl and at least one of the R groups is an $R^1$ group, and no more than 25 percent of the R groups are $R^1$ groups; and (b) 85 to 0 percent by weight of one or more ethylenically-unsaturated comonomers copolymerizable with the organopolysiloxane urethane acrylate;

with the additional feature that the surface of said ophthalmic device has been exposed to a glow discharge treatment.

24. A contact lens, the surface of which is hydrolytically stable and resists deposition of tear components comprising an addition polymer which is the reaction product of a composition comprising:

(a) 15 to 100 percent by weight of at least one organopolysiloxane urethane acrylate having the formula

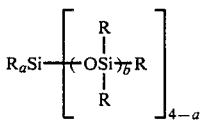

wherein each R is independently an alkyl group having 1 to 6 carbon atoms, a cycloalkyl group having from 3 to 6 carbon atoms, a phenyl group, a hydroxyalkyl group having 1 to 12 carbon atoms, a (polyalkoxyl)alkyl group having 1 to 3 alkoxy groups in which each alkyl group has 1 to 3 carbon atoms, or $R^1$;

wherein $R^1$ is an acryl- or methacryloyloxyalkyl carbamoyloxyalkyl group having the formula,

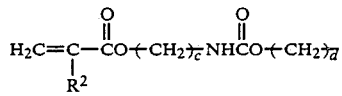

in which $R^2$ is hydrogen or a methyl group, c is an integer of 2 to 6, and d is an integer of 1 to 12;

a is zero, one, or two;

b is a number having an average value from 2 to 100 such that when considered with the value of "a" provides a molecular weight to the organosiloxane urethane acrylate of between 500 and 20,000;

provided that at least 75 percent of all R groups are methyl and at least one of the R groups is an $R^1$ group, and no more than 25 percent of the R groups are $R^1$ groups; and (b) 85 to 0 percent by weight of one or more ethylenically-unsaturated comonomers copolymerizable with the organopolysiloxane urethane acrylate.

25. The contact lens according to claim 24 in which said surface resistance to deposition of tear components is achieved by glow discharge treatment and an optional water vapor treatment.

26. The process according to claim 17 wherein said polysiloxane is in the form of a contact lens, the surface of which has been subjected to a glow discharge treatment.

27. A process for preparing a contact lens comprising the steps of:

(a) preparing a polysiloxane according to claim 1,
(b) forming a contact lens from said polysiloxane, and
(c) subjecting the surface of said contact lens to a glow discharge treatment.

28. The process according to claim 27 further comprising the step of:

subjecting said contact lens to a water vapor treatment.

29. The ophthalmic device according to claim 1 which is a corneal implant.

30. The ophthalmic device according to claim 1 which is a corneal transplant.

31. The ophthalmic device according to claim 1 which is an intraocular lens.

* * * * *

UNITED STATES PATENT AND TRADEMARK OFFICE
CERTIFICATE OF CORRECTION

PATENT NO. : 4,543,398

DATED : September 24, 1985

INVENTOR(S) : Stephen W. Bany, et al.

It is certified that error appears in the above-identified patent and that said Letters Patent is hereby corrected as shown below:

Kindly replace "(polyalkoxyl)alkyl" with --(alkoxy)alkyl--, in the following columns and lines:

col. 3, line 32
col. 6, line 13
col. 15, line 44
col. 17, line 42
col. 18, line 12
col. 19, line 12
col. 20, line 5

Signed and Sealed this

Eighteenth Day of November, 1986

*Attest:*

DONALD J. QUIGG

*Attesting Officer*     *Commissioner of Patents and Trademarks*